US008442989B2

(12) United States Patent
Massoulie et al.

(10) Patent No.: US 8,442,989 B2
(45) Date of Patent: May 14, 2013

(54) METHOD FOR ASSIGNING MULTIMEDIA DATA TO DISTRIBUTED STORAGE DEVICES (75) Inventors: Laurent Massoulie, Saint-Cloud (FR); Christoph Neumann, Rennes (FR); Mary-Luc Champel, Marpire (FR)

(73) Assignee: Thomson Licensing, Issy-les-Moulineaux (FR)

( * ) Notice: Subject to any disclaimer, the term of this patent is extended or adjusted under 35 U.S.C. 154(b) by 274 days.

(21) Appl. No.: 11/895,753

(22) Filed: Aug. 27, 2007

(65) Prior Publication Data
US 2008/0065975 A1    Mar. 13, 2008

(30) Foreign Application Priority Data

Sep. 5, 2006    (EP) .................................... 06120136
Dec. 22, 2006   (EP) .................................... 06301290

(51) Int. Cl.
    G06F 7/00    (2006.01)
    G06F 17/30   (2006.01)

(52) U.S. Cl.
    USPC ............ 707/755; 707/803; 707/809; 707/913

(58) Field of Classification Search ............... 707/104.1, 707/752, 755, 810, 812
See application file for complete search history.

(56) References Cited

U.S. PATENT DOCUMENTS

| 7,272,613 | B2 * | 9/2007 | Sim et al. ...................... 709/223 |
| 7,529,834 | B1 * | 5/2009 | Birrell et al. ................... 709/226 |
| 7,558,797 | B2 * | 7/2009 | Li ........................................ 1/1 |
| 7,685,360 | B1 * | 3/2010 | Brunnett et al. ............... 711/112 |
| 2002/0107865 | A1 * | 8/2002 | Rotem et al. .................. 707/102 |
| 2002/0107968 | A1 * | 8/2002 | Horn et al. ..................... 709/230 |
| 2003/0133695 | A1 * | 7/2003 | Hirabayashi et al. ........... 386/68 |
| 2004/0230654 | A1 * | 11/2004 | Gemmell ........................ 709/204 |
| 2004/0266336 | A1 * | 12/2004 | Patsiokas et al. ............. 455/3.04 |
| 2005/0054287 | A1 * | 3/2005 | Kim .............................. 455/3.05 |
| 2005/0089312 | A1 * | 4/2005 | Shirakawa et al. ........... 386/111 |

(Continued)

FOREIGN PATENT DOCUMENTS

EP    1 633 112    3/2006

OTHER PUBLICATIONS

Cooley, J.A.; Mineweaser, J.L.; Servi, L.D.; Tsung, E.T.; , "Software-based erasure codes for scalable distributed storage," Mass Storage Systems and Technologies, 2003. (MSST 2003). Proceedings. 20th IEEE/11th NASA Goddard Conference on, pp. 157-164, Apr. 7-10, 2003.*

(Continued)

*Primary Examiner* — Wilson Lee
*Assistant Examiner* — Mark E Hershley
(74) *Attorney, Agent, or Firm* — Myers Wolin, LLC (57) ABSTRACT The invention concerns a method for assigning parts of multimedia files to distributed storage devices, the number of said devices being an integer n, characterized in that it comprises the following steps:
  a step consisting in dividing each multimedia file in windows, which represent data for contiguous playback of a given duration;
  a step consisting, for each multimedia file, in determining a number k so that any original window of file can be recovered from any k distinct symbols;
  a step consisting, for each window of each said multimedia files, in assigning n corresponding symbols to said devices, one to each device, the n distinct symbols being created using erasure coding; and
  a step consisting in partially or totally filling the storage memory left on each device after said first steps with prefix windows of said multimedia files.

8 Claims, 6 Drawing Sheets

U.S. PATENT DOCUMENTS

2006/0069800 A1* 3/2006 Li .................................. 709/232
2006/0174063 A1* 8/2006 Soules et al. ................... 711/118
2008/0060034 A1* 3/2008 Egnal et al. .................... 725/105
2009/0028428 A1* 1/2009 Dovstam et al. .............. 382/166

OTHER PUBLICATIONS

Jin Li; Cha Zhang; , "Distributed hosting of Web content with erasure coding and unequal weight assignment," Multimedia and Expo, 2004. ICME '04. 2004 IEEE International Conference on , vol. 3, pp. 2087-2090 vol. 3, Jun. 27-30, 2004.*

Peng, X.-H.; , "Erasure-control coding for distributed networks," Communications, IEE Proceedings- , vol. 152, No. 6, pp. 1075-1080, Dec. 9, 2005.*

Sobe, P.; Peter, K.; , "Combining Compression, Encryption and Fault-tolerant Coding for Distributed Storage," Parallel and Distributed Processing Symposium, 2007. IPDPS 2007. IEEE International, pp. 1-8, Mar. 26-30, 2007.*

Malluhi, Q.M.; Johnston, W.E.; , "Approaches for a reliable high-performance distributed-parallel storage system," High Performance Distributed Computing, 1996., Proceedings of 5th IEEE International Symposium on, pp. 500-509, Aug. 6-9, 1996.*

Li, V.O.K.; Wanjiun Liao; , "Distributed multimedia systems," Proceedings of the IEEE , vol. 85, No. 7, pp. 1063-1108, Jul. 1997.*

Lee J.Y.B. et al. "Design and analysis of a fault-tolerant mechanism for a serve r-less video on-demand system"Parallel and Distributed Systems, 2002. Proceedings Ninth International Cnference on Dec. 17-20, 2002, Piscataway, NJ USA IEEE Dec. 17, 2002 pp. 489-494, XP010628948 ISBN: 0-7695-1760-9 pp. 490 & 491.

Mitzenmacher M: "Digital fountains: a survey and look forward" Information Theory Workshop, 2004, IEEE San Antonio, TX, USA Oct. 24-29, 2004, Piscataway, NJ, USA, IEEE Oct. 24, 2004 pp. 271-276, XP010776150 ISBN: 0-7803-8720-1 p. 272, p. 274.

Search Report dated Jun. 6, 2007.

* cited by examiner

METHOD FOR ASSIGNING MULTIMEDIA DATA TO DISTRIBUTED STORAGE DEVICES

This application claims the benefit, under 35 U.S.C. §119 of European Patent Application 06120136.4, filed Sep. 5, 2006 and European Patent Application 06301290.0 filed Dec. 22, 2006.

FIELD OF THE INVENTION

The present invention pertains to the field of content distribution in communication networks.

BACKGROUND OF THE INVENTION

The invention more particularly relates to a method for assigning parts of multimedia files to distributed storage devices to allow efficient multimedia playback of any multimedia file from any device. It assumes that a shared communication channel is available, e.g. devices have WIFI interfaces and are within communication range. The shared communication channel could for instance be a broadcast channel.

With various systems of storage devices that cooperate to allow each device to access multimedia content, reliability is, in the prior art, accomplished by increasing reliability on each device and not on the entire system seen globally. The present invention relies on the presence of a shared communication channel between devices so as to bring additional reliability to the system. Reliability is considered with respect to device failures. Unlike in systems of the prior art, quality of service requirements, minimizing occurrences of degraded playback experience, are taken into account in the present invention.

SUMMARY OF THE INVENTION

An aim of the present invention is to propose a method to distribute encoded parts of each multimedia file to ensure pre-specified reliability guarantees of the system in the presence of device failures.

Another aim of the present invention is to propose a method to assign additional, not necessarily encoded parts of the multimedia files, to devices to ensure that a maximal number of concurrent devices can simultaneously play back distinct multimedia files. This will exploit knowledge of the popularity of distinct multimedia files, if information on such popularity is available.

The technical problem the present invention seeks to solve is the following: how to distribute data from multimedia files on distributed storage devices so that, using a shared communication channel, devices can efficiently playback stored multimedia files, even in the presence of failures of a fraction of the devices?

The present invention is defined, in its broader sense, in claim 1.

Advantageous embodiments are presented in the dependent claims.

A method is presented for achieving the desired placement of data to devices with minimal use of the shared communication channel and maximal quality of service for playback.

Other aspects of the present invention include:
  i) a scheme for using the shared communication channel during playback operation; and
  ii) a scheme for managing storage on devices during playback operation.

BRIEF DESCRIPTION OF THE DRAWINGS

The following detailed description will be better understood with the drawings, in which.

DETAILED DESCRIPTION

We first assume that each multimedia file is divided in windows, each window representing data for contiguous playback of a given duration.

This desired placement of parts of files comprises two main steps.

In a first step (also referred to below as "Phase 1"), a fixed fraction of each file that needs to be placed on each device is determined. This fraction is selected to meet a particular local reliability target. The details are as follows.

It is assumed that the failure probability of each device is known, and denote it by p. It is also assumed that a maximum probability of loosing a particular file f is given, and denote it by p(f). We let n denote the total number of devices that can communicate via the shared communication channel. We then determine the "decoding number" k(f) of file f as follows. It is chosen as the largest integer k such that the probability that a Binomial random variable with parameters (n,p) exceeds the integer n-k is not larger than the target reliability probability p(f). In other words, it is the largest integer k in $\{0, \ldots, n\}$ so that the following inequality holds:

$$\sum_{i=n-k+1}^{n} p^i (1-p)^{n-i} \binom{n}{i} \leq p(f).$$

We assume that multimedia files are separated into so-called windows that represent data for contiguous playback of a given duration (e.g. one second).

Once k(f) is determined, one form of erasure coding is used so that for each specified window of multimedia file f, n distinct symbols are created, so that the original window of file can be recovered from any k(f) distinct symbols. Then for each window of the file, the n corresponding symbols are assigned one to each device. Such erasure codes are very common in the literature, codes such as Low Density Parity Check Codes (LDPC), Raptor Codes (RC) or Reed-Solomon codes (RS) are all examples of the erasure codes that could be used in this phase. This operation is repeated for each window of file f, and then for each file in the collection to be stored.

Figure 1:
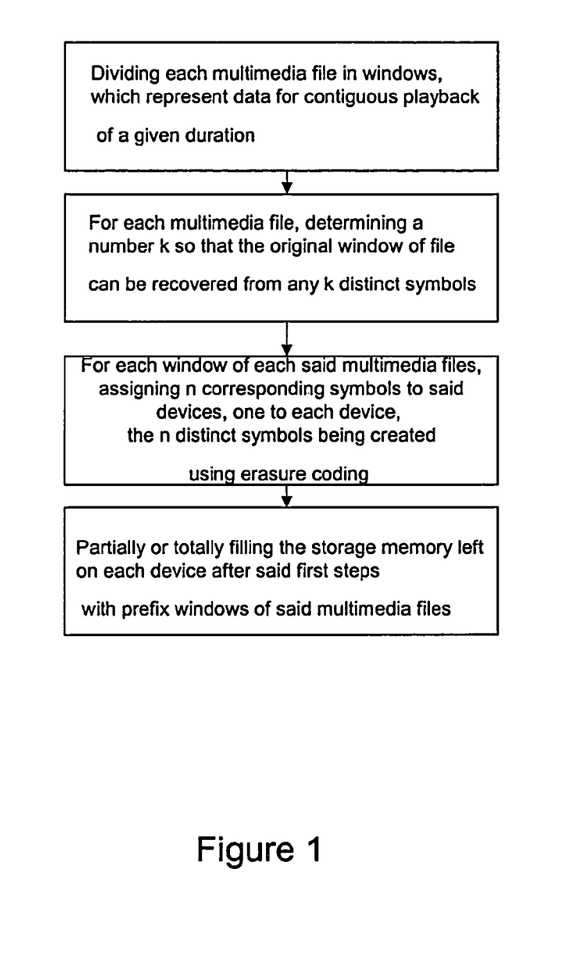
FIG. 1 shows the steps of the method according to the present invention.
Figure 2:
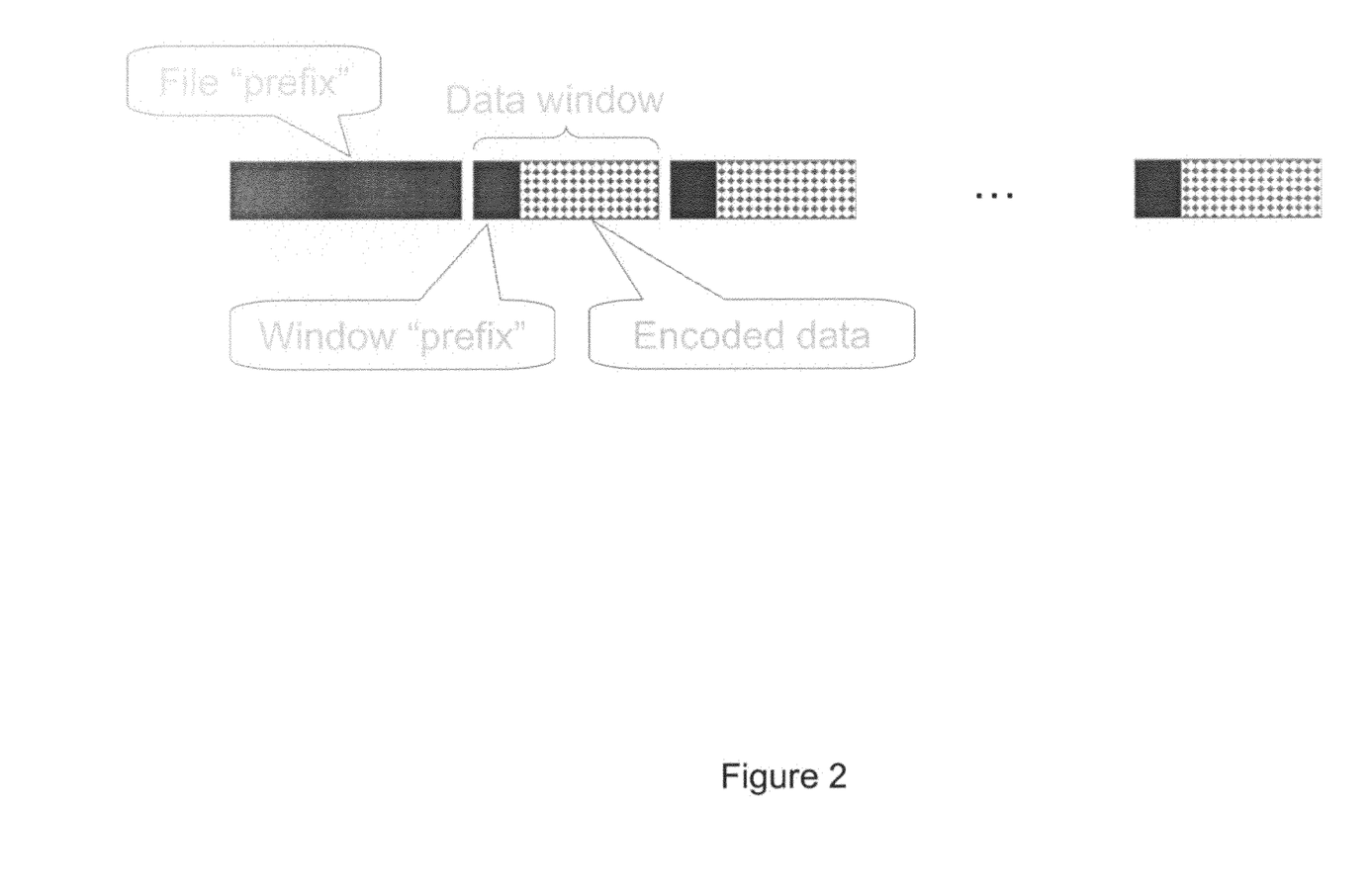
FIG. 2 represents a file and windows according to the present invention.
Figure 3:
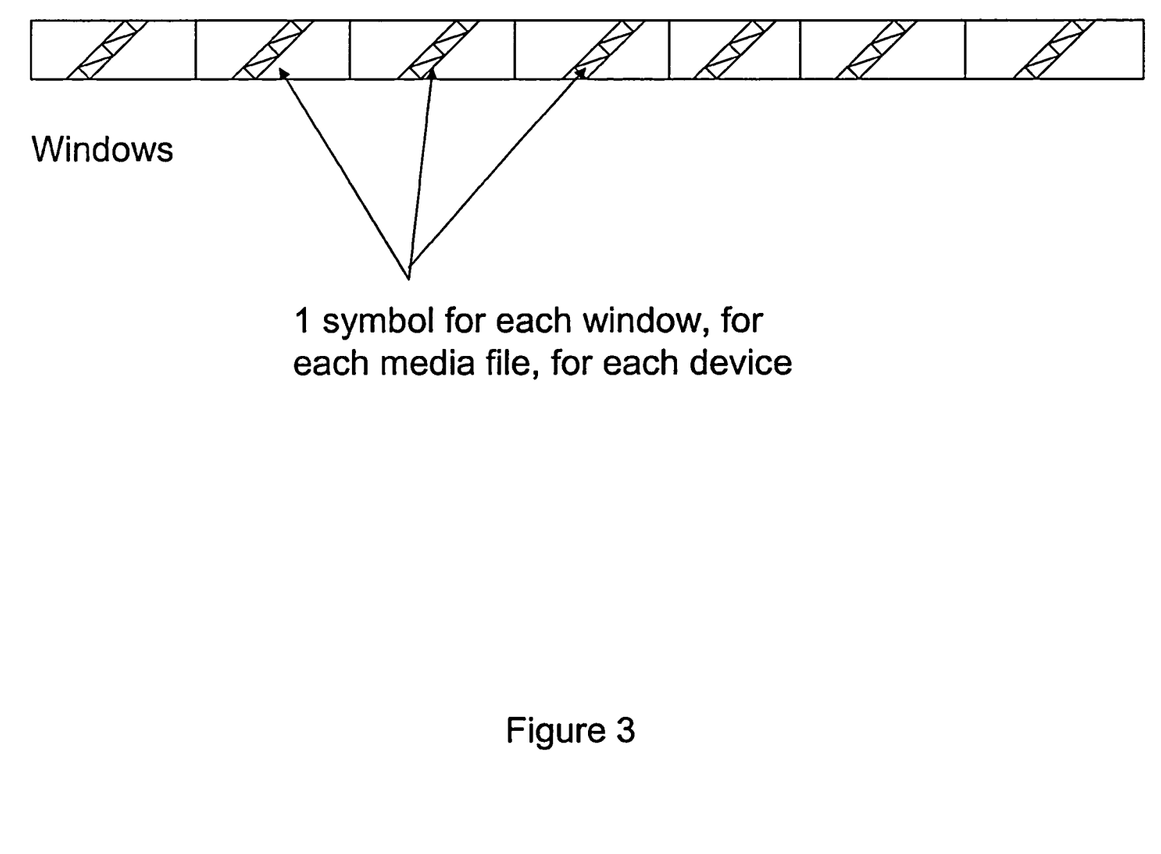
FIG. 3 illustrates windows according to the present invention.

FIG. 3 represents, according to the present invention, a file comprising windows, where there is one symbol for each window, for each media file, for each device. This Figure represents those symbols unique to a given file and a given device. Each window of each file f can be reconstructed from any collection of k(f) distinct symbols relative to this file and this window.

The memory space that is left available on each device will be used to store additional parts of the files, to optimize the quality of playback. We chose to store prefixes of movies that are contiguous collections of windows starting with the first window of the movie (see FIG. 5). The reason for this choice is that a prefix is needed to start playback.

The second step (also referred to below as "Phase 2") is pursued as follows. One determines the storage memory left on each device at the end of phase 1. For each device, one determines the size of file f, that we denote by S(f), to be stored on the device. [We assume for simplicity that this size is device-independent; extensions may handle device-dependent sizes, which are useful for instance when devices have distinct storage memories]. These sizes S(f) are chosen to minimize the probability that for any given file f, playback events of file f are either delayed or interrupted.

To be more specific, we need to specify the scheduling strategy used to do playback when multiple playbacks take place.

We thus consider the following scheduling strategy. Any device d involved in a playback determines its lead time, denoted by T(d), that is the time until it will stop being able to playback if it doesn't get additional data via the shared communication channel. The shared communication channel then sends in priority the next data window required for playback by the device d with the smallest lead time T(d) among all lead times. This is an instance of the so-called Earliest-Deadline-First scheduling strategy, which is known to have desirable optimality properties [see e.g. LeBoudec and Thiran, "Network Calculus, a theory of deterministic queuing systems for the Internet", Springer Verlag, 2001].

Under such scheduling strategy, we assume that the additional data S(f) from file f stored on any device is in fact a prefix of file f, that is the first S(f) data windows in playback order. To fully specify the values S(f), we assume that the following information is available: the frequency at which any device will access file f, denoted by λ(f).

Then we determine the sizes S(f) as follows. Denote by fail(f) the frequency at which requests to playback file f have to be delayed, in order not to interrupt ongoing requests, and under the Earliest-Deadline-First scheduling policy just described. We choose S(f) so that the largest value of fail(f) is minimized, under the constraints that $$\sum_f S(f) \leq M$$

where M is the memory space remaining in a given device for all files after the end of phase 1. We note that no closed form expressions exist for the values of fail(f) under standard assumptions on requests; we propose to evaluate these either via simulation, or via the use of approximate formulas available in the literature [notably, heavy-traffic approximations of the performance of earliest-deadline-first schedulers are available; see for instance ref. "Service-Differentiation for Delay-Sensitive Applications: An Optimisation-Based Approach", by Peter Key, Laurent Massoulié and Jonathan Shapiro, in Proceedings of IFIP Performance 2002 Conference.]

Figure 4:
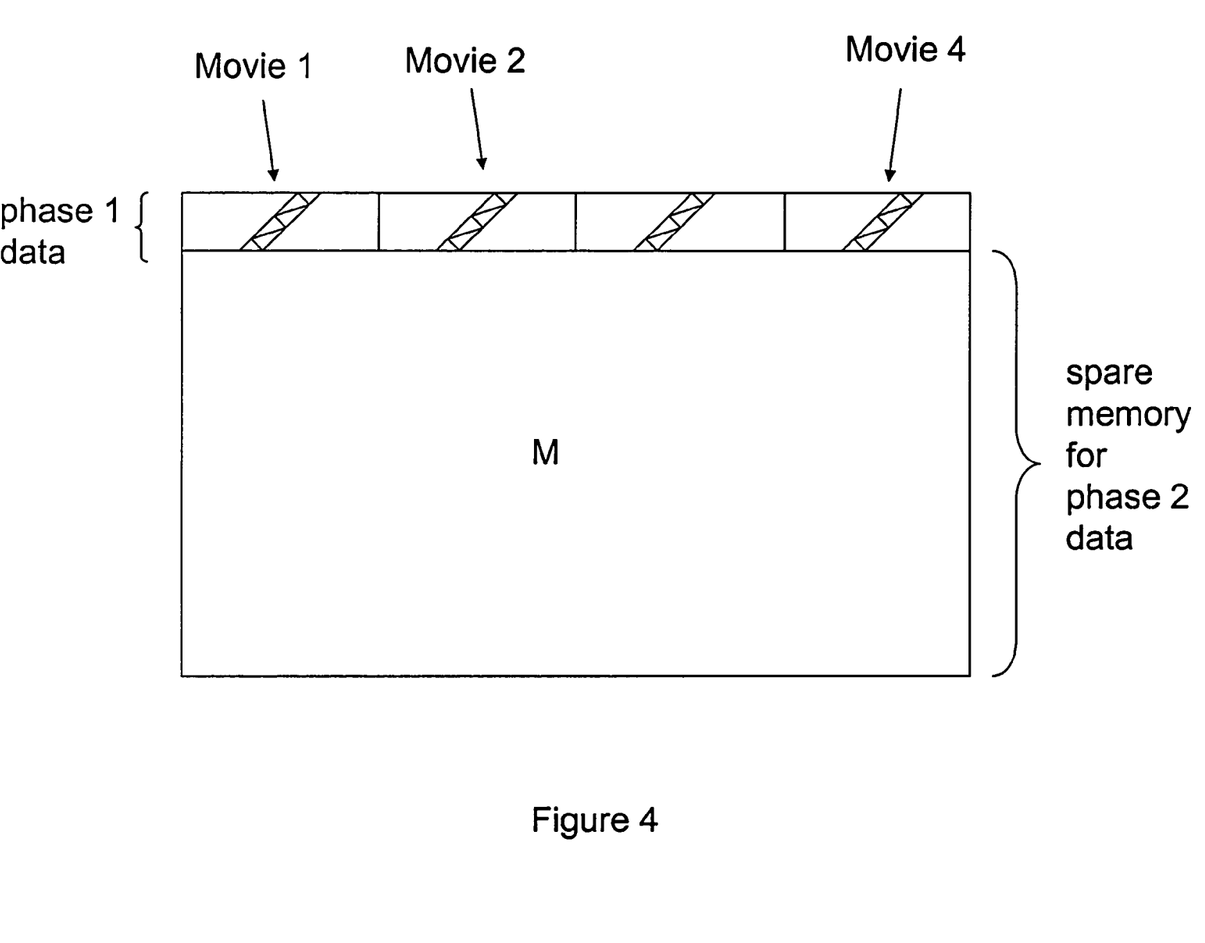
FIG. 4 shows the state of the memory of a device according to the method of the present invention.

FIG. 4 represents the memory space in a given device, where phase 1 data can be found for movies (files) 1, 2, 3 and 4 and where M is the spare memory space for phase 2 data.

Figure 5:
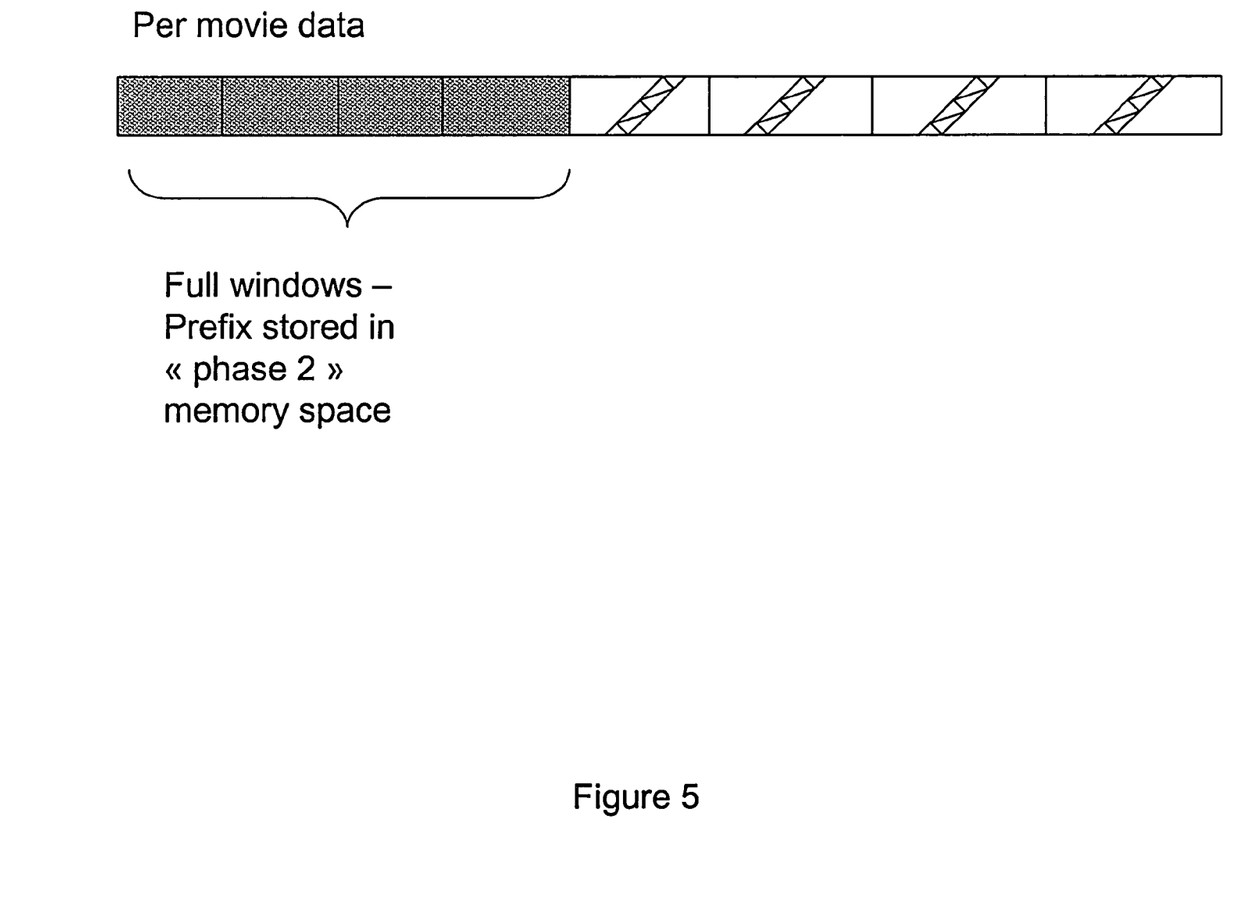
FIG. 5 represents per movie data: prefix windows and encoded data according to the present invention.

FIG. 5 illustrates data per movie: prefix windows and phase 1 encoded data.

Figure 6:
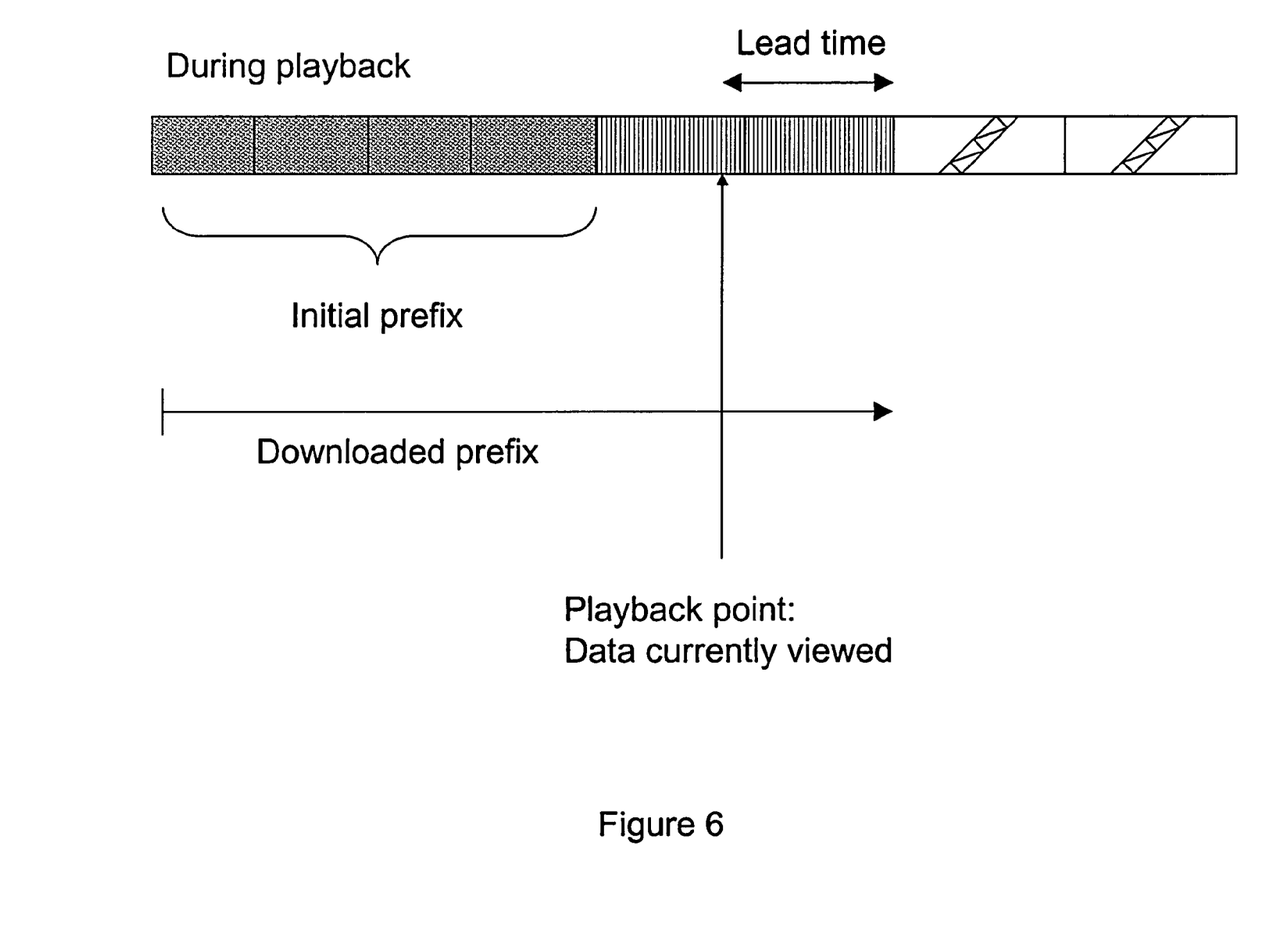
FIG. 6 illustrates prefix windows during playback according to the present invention.

FIG. 6 illustrates, according to the present invention, prefix windows during playback. In particular, there is a first set of windows, called the initial prefix, which constitutes "phase 2 data" relative to this file. There is then a number of other contiguous windows which have been downloaded after playback has started. Among these, one distinguishes between data that has already been played back and data that is still due to playback. The amount of such data that is still due to playback determines the "lead time", that is the time until playback interruption if the device does not obtain additional data.

A novelty of the above-described ideal file placement strategy is that it combines erasure-encoded data placement with not necessarily encoded data placement to jointly optimize i) reliability, and ii) quality of service, measured in terms of delayed playbacks.

One other advantage of the approach is that no particular care is needed in selecting from which device data needs to be retrieved. Indeed a random selection of sufficiently many devices will do.

Another important aspect of the method concerns the management of storage during playback. We propose to overwrite Phase 2-data from files not currently being played back by downloaded data from the file currently being played back, and this on any device. We would not allow to overwrite Phase 1-data so that the reliability is not affected. During idle periods, the device can then recover data that has been overwritten during playback from other devices. This would take place at the lowest possible priority. [Alternatively, we may save some memory that is used only to buffer data due to be played back, while not overwriting any of the original data assignment.]

The overwriting of data can advantageously be performed by exploiting the popularity of the multimedia files (movies for instance). A commercial blockbuster popular movie would not be overwritten, whereas a more confidential movie could be overwritten.

Another aspect of the method concerns how the placement is effectively done in practice, once the two critical parameters, that is k(f), and S(f), have been determined for each file. We suggest the following approach. The shared communication channel is used to broadcast each file. During the broadcast of a given file f, any device stores the desired prefix of size S(f); beyond this prefix, it creates window-by-window the encoded data it will keep for file f. This can be done by locally generating at random erasure codes.

Alternatively, in another embodiment of the invention, a more efficient approach would consist in broadcasting the original files augmented with a first stage of erasure codes, and let devices generate random codes say according to Luby's LT coding scheme from all these inputs, so that the codes stored on the devices are in fact Raptor codes [see IETF draft, "Raptor Forward Error Correction Scheme for Object Delivery", M. Luby, 2006 Jun. 23].

More generally any fountain code, such as LT, Raptor codes, or LDPC, can be used for this embodiment.

One context of interest is that of In-Flight Entertainment, where devices are assigned to plane seats, and groups of seats communicate using WIFI. In that context, the ultimate goal is to allow high-performance video-on-demand from any seat.

Another context of interest is that of a distributed storage system where in an entire network, the content is distributed all over the network. Such a system actually adds reliability since content is not only present in several places but will also be copied temporarily to new locations where it needs to be locally accessed.

The above specification, examples and drawings provide a complete description of the method according to the present invention. Since many embodiments of the invention can be made without departing from the spirit and scope of the invention, the invention resides in the claims herein after appended.

The invention claimed is:

1. A method of assigning parts of multimedia files to distributed storage devices, the number of said devices being an integer n, the method comprising:

dividing each multimedia file f in data windows, which represent multimedia data for contiguous playback of the respective multimedia file f of a given duration;

for each multimedia file f, determining a number k(f) with k<n so that any original data window of said multimedia file f can be recovered from any k(f) distinct symbols, the symbols being created using erasure coding in accordance with k(f);

for each data window of each said multimedia files, creating n distinct symbols using said erasure coding, and storing the n distinct symbols in said storage devices, one in each storage device; and partially or totally filling storage memory left on each storage device after the dividing of each multimedia file f in the data windows, the determining of the number k(f) and the creation and storing of the n distinct symbols, with at least the first window of the respective one or more multimedia files, wherein said at least first window is not coded using erasure coding, and said at least first window represents a prefix needed to start playback of the representative one or more multimedia files.

2. Method for assigning parts of multimedia files to distributed storage devices according to claim 1 wherein said method further comprises broadcasting each file.

3. Method for assigning parts of multimedia files to distributed storage devices according to claim 1 wherein the number k(f) of a multimedia file to be stored on a storage device, is chosen in accordance with the probability of failure of a storage device storing a distinct symbol of a multimedia file.

4. Method for assigning parts of multimedia files to distributed storage devices according to claim 1 wherein data corresponding to the partially or totally filling storage memory left on each storage device from files not being played back are overwritten by downloaded data from a multimedia file being played back.

5. Method for assigning parts of multimedia files to distributed storage devices according to claim 2 wherein, during the broadcast of a multimedia file, any storage device stores a desired prefix having a size, which is equal to the size of the multimedia file to be stored on this storage device, and in that, beyond this prefix, it creates window-by-window encoded data it will keep for the multimedia file to be stored.

6. Method for assigning parts of multimedia files to distributed storage devices according to claim 2 wherein original multimedia files augmented with a first stage of erasure codes are broadcasted, and in that the storage devices generate random codes.

7. Method for assigning parts of multimedia files to distributed storage devices according to claim 1 wherein the partially or totally filling storage memory left on each storage device is performed using indications of the popularity of said multimedia files.

8. The method of claim 4, wherein data that was overwritten by downloaded data from a multimedia file being played back is recovered from other devices when play back is terminated.

* * * * *